(12) United States Patent
Jauho

(10) Patent No.: US 7,519,863 B2
(45) Date of Patent: Apr. 14, 2009

(54) DETECTION OF A MALFUNCTION IN A HARDWARE MODULE

(75) Inventor: Ilkka Jauho, Oulu (FI)

(73) Assignee: Nokia Corporation, Espoo (FI)

( * ) Notice: Subject to any disclaimer, the term of this patent is extended or adjusted under 35 U.S.C. 154(b) by 511 days.

(21) Appl. No.: 11/134,609

(22) Filed: May 20, 2005

(65) Prior Publication Data

US 2006/0265628 A1    Nov. 23, 2006

(51) Int. Cl.
    *G06F 11/00* (2006.01)
(52) U.S. Cl. ............................ 714/30; 714/37; 714/40
(58) Field of Classification Search ............... 714/25, 714/30, 37, 40, 49
    See application file for complete search history.

(56) References Cited

U.S. PATENT DOCUMENTS

| 5,793,946 | A  | * | 8/1998 | Gauthier et al. | ............... | 714/25 |
| 6,119,246 | A  | * | 9/2000 | McLaughlin et al. | .......... | 714/27 |
| 6,615,374 | B1 | * | 9/2003 | Moran | ........................ | 714/48 |
| 7,107,490 | B2 | * | 9/2006 | Eisenhoffer et al. | ........... | 714/30 |
| 7,124,060 | B1 | * | 10/2006 | Eriksson et al. | ............. | 702/185 |
| 7,130,261 | B1 | * | 10/2006 | Skrzynski et al. | ............ | 370/216 |
| 7,134,063 | B2 | * | 11/2006 | Cho et al. | .................... | 714/733 |
| 7,168,004 | B2 | * | 1/2007 | Sugimura et al. | ............. | 714/30 |
| 7,308,492 | B2 | * | 12/2007 | Konopka et al. | ............. | 709/221 |
| 7,313,739 | B2 | * | 12/2007 | Menon et al. | ............... | 714/718 |
| 2004/0025080 | A1 | * | 2/2004 | Gardner et al. | ................ | 714/25 |
| 2004/0066382 | A1 | * | 4/2004 | Aoki | .......................... | 345/204 |
| 2004/0153786 | A1 | * | 8/2004 | Johnson et al. | ............... | 714/25 |
| 2004/0221198 | A1 | * | 11/2004 | Vecoven | ...................... | 714/25 |
| 2006/0156156 | A1 | * | 7/2006 | Elnozahy | ..................... | 714/746 |

\* cited by examiner

*Primary Examiner*—Joshua A Lohn

(57) ABSTRACT

A method of detecting a malfunction in a hardware module is shown. The hardware module comprises a functional hardware adapted to provide a defined function and a diagnosis component. The diagnosis component includes a logic and a status register. The logic has access to the functional hardware and a value of the at least one status register is readable by a software external to the hardware module. The method comprises at the logic receiving a check status command from an external software, checking the status of the functional hardware, and updating a value of the at least one status register depending on a result of the status check.

17 Claims, 3 Drawing Sheets

DETECTION OF A MALFUNCTION IN A HARDWARE MODULE

FIELD OF THE INVENTION

The invention relates to a method of detecting a malfunction in a hardware module. The invention relates equally to a corresponding hardware module and to a device comprising such a hardware module.

BACKGROUND OF THE INVENTION

A malfunction in a hardware module can be caused by various external influences, like electrostatic discharge (ESD) pulses, electrical glitches, power shortages, etc. External influences may alter for example the values of registers of the hardware module or required voltage levels within the hardware module.

Such a malfunction in a hardware module can usually be removed by means of a hardware reset.

Conventionally, the values of identity (ID) registers and of status registers of a hardware module are read by an external software and compared to expected values, in order to recognize a possible hardware failure requiring a hardware reset. If a hardware failure is detected in this comparison, all registers of the hardware module are updated. This approach has the disadvantage, however, that extensive information about the internal functionality of the hardware module has to be known. The internal status of a hardware module is frequently very complex and thus difficult to verify by software. Some failure mechanisms cannot be found at all by means of a software check.

Further, the module may fail completely. In this case, the module may not be able to answer any software request before a hardware reset is performed. The internal functionality of the module may also be disturbed inasmuch as no information can be gained anymore from outside, which prevents equally a status check by the software.

Therefore, the hardware registers are usually updated in addition at regular intervals defined by module internal watchdog timers, in order to prevent a failure which is not detected by the software. A regular hardware reset, however, has the disadvantage that it might be annoying to a user noticing some kind of regular interruption in a function provided by the hardware module.

SUMMARY OF THE INVENTION

It is an object of the invention to enable an improved diagnosis of the functions of a hardware module.

A method of detecting a malfunction in a hardware module is proposed, wherein the hardware module comprises a functional hardware adapted to provide a defined function and a diagnosis component. The diagnosis component includes a logic and a status register. The logic has access to the functional hardware and a value of the at least one status register is readable by a software external to the hardware module. The proposed method comprises at the logic receiving a check status command from an external software and checking a status of the functional hardware. The proposed method further comprises at the logic updating a value of the at least one status register depending on a result of the status check.

Moreover, a hardware module is proposed, which comprises a functional hardware adapted to provide a defined function. The proposed hardware module further comprises a diagnosis component including a logic and at least one status register. The status register is readable by a software external to the hardware module. The logic has access to the functional hardware. The logic is further adapted to receive at least one kind of check status command from an external software and to check a status of the functional hardware upon receipt of a check status command. The logic is further adapted to update a value of the at least one status register depending on a result of a performed status check. The hardware module can be for instance part of a device running the external software or be connectable to a device running the external software.

Finally, a device is proposed, which comprises the proposed hardware module and in addition a processing unit running the software external to the hardware module.

The invention proceeds from the idea that instead of an external software, an integrated logic could be used for the actual check of the functional status of a hardware module. The logic could then indicate the result of the check in a status register which can be read by an external software.

It is an advantage of the invention that the internal functionality of the hardware module does not have to be known to the developer of the external software. Further, the complexity of the external software used for checking the status of the hardware module can be reduced significantly. As the self-diagnosis of the hardware module is triggered by an external software activity, moreover, no watchdog timers are required within the hardware module.

The external software can cause the logic at desired intervals to perform a status check by sending a check status command. The external software can moreover read the value of the at least one status register after a status check has been performed. If the read value of the at least one status register indicates a malfunction in the hardware module, the external software may further send a hardware reset command to the hardware module, by which a hardware reset of at least part of the functional hardware is caused.

The check status command can be one general check status command or a specific one of several defined check status commands. In the latter case, the logic may perform only a partial status check which is associated to the specific check status command. Upon receipt of a first specific check status command, the logic may verify for instance only whether the voltage levels in the functional hardware are correct, while upon receipt of a second specific check status command, the logic may verify for instance only whether the register values in the functional hardware are correct.

In one embodiment of the invention, the logic alters the value of the at least one status register only in case no failure has been detected. Thereby, the software can detect various types of malfunctions. First of all, if the logic determines that the functional hardware of the hardware module failed, always the same status register value or values will be read by the software. In addition, if the interface of the hardware module is disturbed, always the same status register value or values will be read by the software. Finally, also if the functionality of the logic itself is disturbed, always the same status register value or values will be read by the software, as the logic will not be able anymore to alter the value of the at least one status register.

The at least one status register may comprise one status register or a plurality of status registers. In case the at least one status register comprises a plurality of status registers, each of the registers may be associated to another problem area related to the functional hardware of the hardware module. Different problem areas may be for instance register values, voltage levels, or functional statuses like booster statuses or the status of some other sub-hardware module of the functional hardware, etc. The logic may then alter the value of a specific status register only, in case no malfunction in the associated problem area was detected.

The value of the at least one status register can be altered in various ways, for instance by incrementing a counter, by inverting a bit, etc.

The hardware module according to the invention can be any hardware module in which a malfunction has to be detected, for instance a liquid crystal display (LCD) module or a camera module, etc. The device according to the invention can be any device comprising such a hardware module, for example a mobile terminal including an LCD module.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
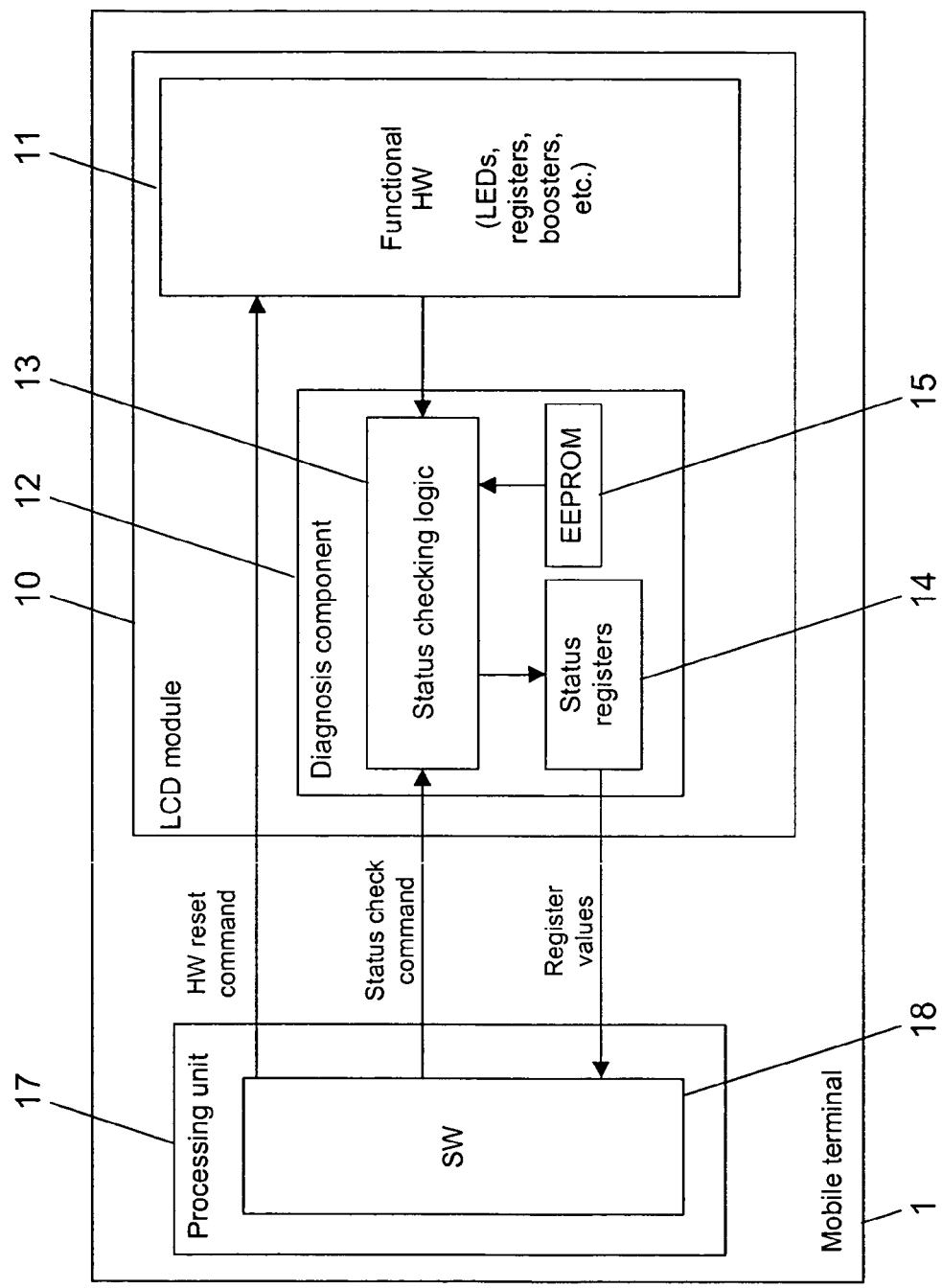
FIG. 1 is a schematic block diagram of a device according to an embodiment of the invention.

FIG. 1 schematically presents a mobile terminal 1 as an exemplary device according to the invention, which allows an improved diagnosis of malfunctions in an LCD module 10 as an exemplary hardware module according to the invention.

The mobile terminal 1 comprises the LCD module 10 and a processing unit 17.

The LCD module 10 includes a functional hardware 11 providing the actual functions of the LCD module 10, as known from the state of the art. The functional hardware 11 may comprise to this end light emitting diodes (LEDs), ID and status registers, boosters, etc. The LCD module 10 further includes a diagnosis component 12. The diagnosis component 12 comprises a status checking logic 13 realized in hardware, a plurality of status registers 14 and an electrically erasable programmable read-only memory (EEPROM) 15. The status checking logic 13 has access to the functional hardware 11, to the status registers 14 and to the EEPROM 15. It is to be understood that instead of the EEPROM 15, as well any other suitable storing component could be employed, like for example a mask ROM, a flash memory or some logic based memory.

The processing unit 17 runs a software 18 which has a reading access to the status registers 14, and moreover a controlling access to the status checking logic 13 and the functional hardware 11.

Figure 2:
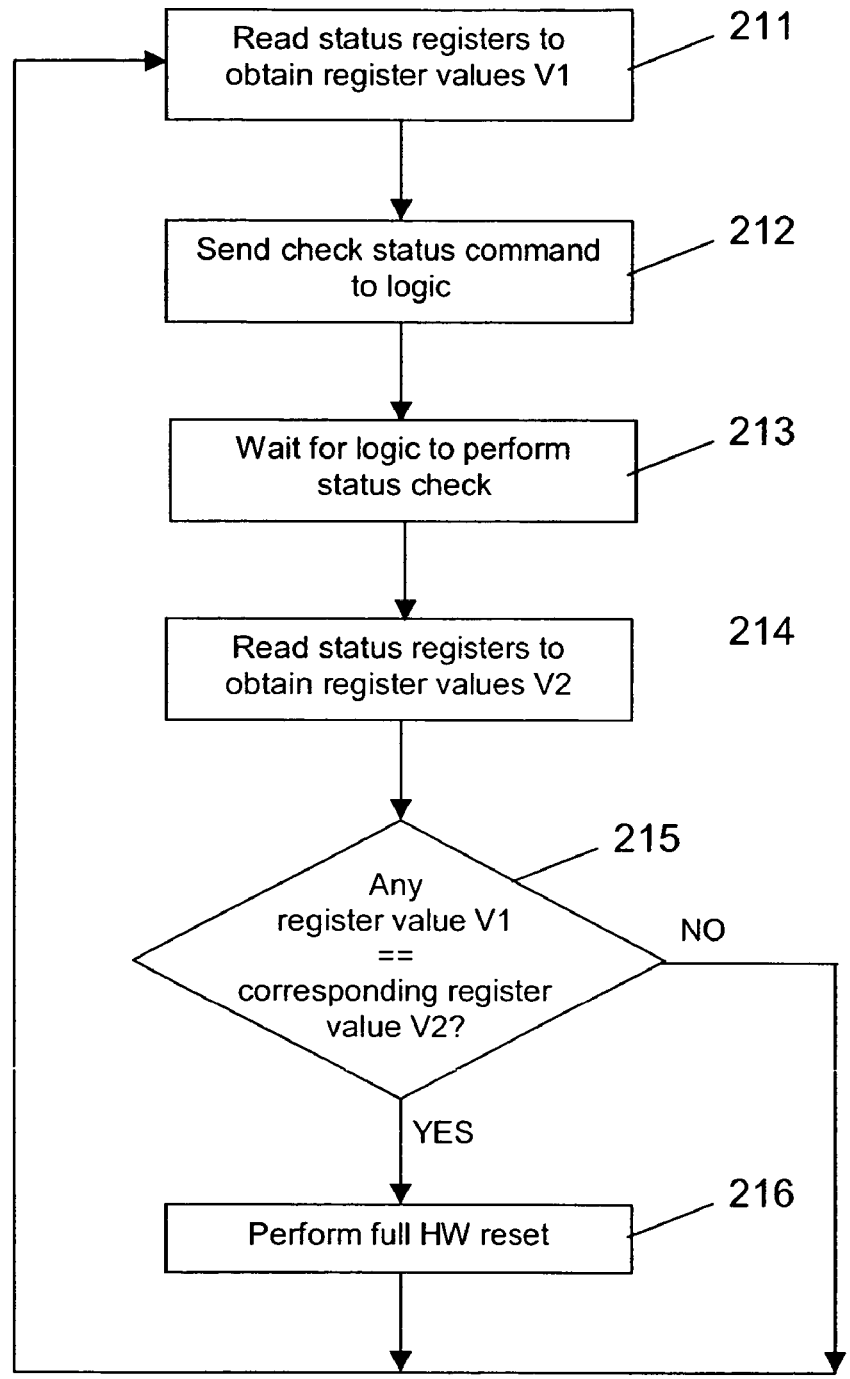
FIG. 2 is a flow chart illustrating the activity of a software in the device of FIG. 1.

The operation of the mobile terminal 1 will now be described with reference to the flow charts of FIGS. 2 and 3. FIG. 2 illustrates the operation of the software 18 running in the processing unit 17, while FIG. 3 illustrates a status check by the status checking logic 13.

Whenever the functioning of the LCD module 10 is to be checked, the software 18 reads the current values of the status registers 14 of the diagnosis component 12, which is indicated in FIG. 2 as a step 211. The software 18 thereby obtains a first version V1 of the register values. Then, the software 18 sends a check status command to the status checking logic 13 of the diagnosis component 12, which is indicated in FIG. 2 as a step 212. As indicated in FIG. 2 as a step 213, the software 18 now waits for a predetermined period of time, during which the checking logic 13 performs the status check illustrated in FIG. 3.

Figure 3:
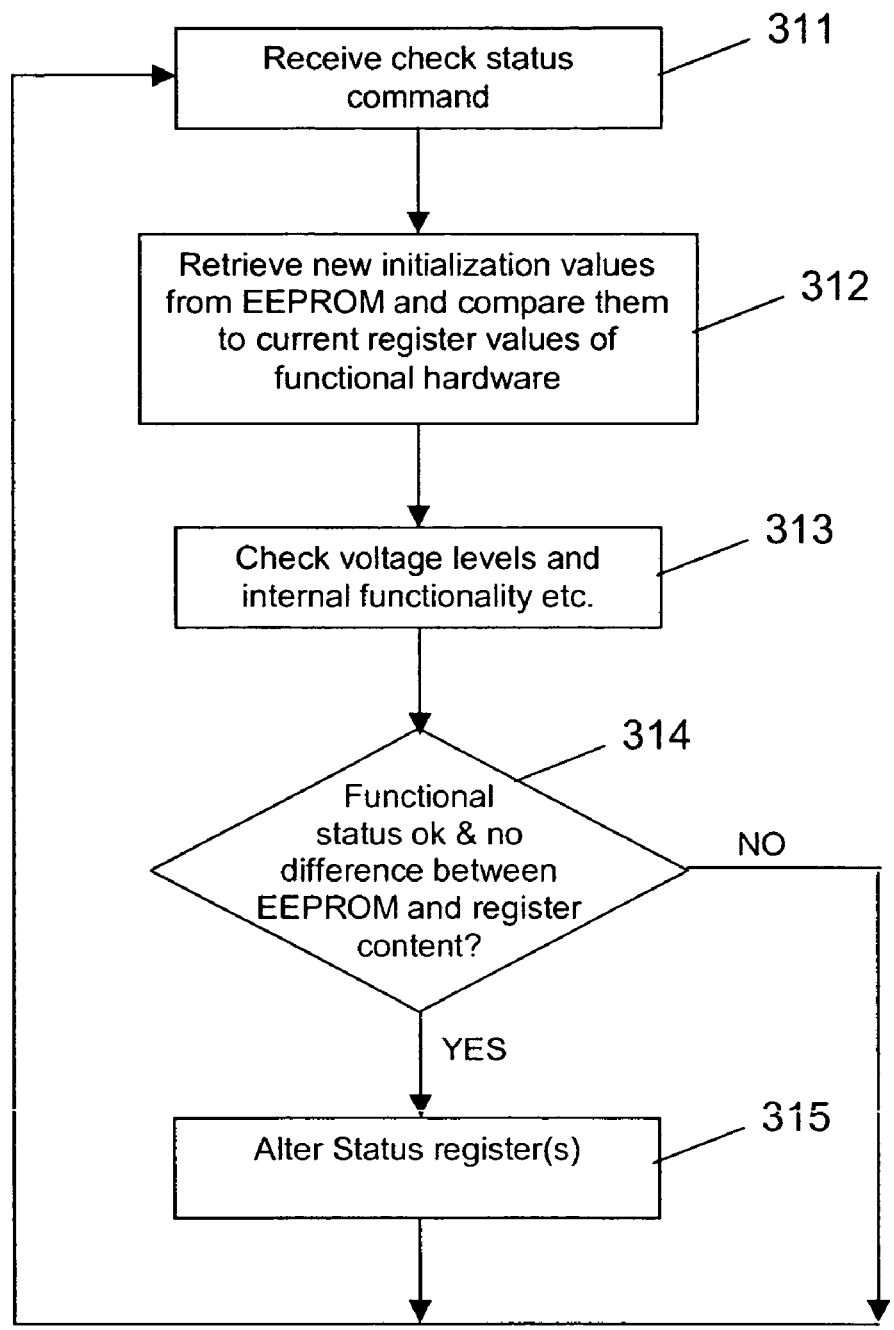
FIG. 3 is a flow chart illustrating the operation of a hardware logic in the device of FIG. 1.

Upon receipt of a check status command from the software 18, which is indicated in FIG. 3 as a step 311, the status checking logic 13 retrieves initialization values from the EEPROM 15 and reads the values of registers of the functional hardware 11. As long as there is no malfunction in the functional hardware 11, the values of registers of the functional hardware 11 should correspond to the initialization values stored in the EEPROM 15. The status checking logic 13 therefore compares the initialization values retrieved from the EEPROM 15 with the read values of the registers of the functional hardware 11. This is indicated in FIG. 3 as a step 312.

In addition, the status checking logic 13 checks the functional status of the functional hardware 11. The status checking logic 13 may determine to this end for example the current voltage levels in the functional hardware 11 and compare them to predetermined voltage levels. Moreover, the status checking logic 13 may determine to this end the internal functionality of the functional hardware 11 including booster statuses, etc., and compare it to a predetermined internal functionality. This is indicated in FIG. 3 as a step 313.

Each of the status registers 14 is associated to a particular one of the criteria checked in steps 312 and 313. For instance, one status register may be associated to the checked registers of the functional hardware 11, another one to the checked voltage levels in the functional hardware 11, and yet another one to the checked internal functionality of the functional hardware 11.

If the status checking logic 13 detects in a step 314 that there is no difference between the retrieved EEPROM values and the read register values and/or that the checked functional status corresponds to the required functional status, the status checking logic 13 alters the value of the respectively associated status register 14. This is indicated in FIG. 3 as a step 315. By way of example, the value of each of the status registers 14 is altered by inverting a bit, in case the associated checked criteria is in good order. Alternately, the value of the status registers 14 could be altered by incrementing the current value, which corresponds to increasing a counter value.

Thereafter, the status checking logic 13 returns to a waiting state for receiving a new check status command from the software in step 311.

If the status checking logic 13 detects in step 314 that there is a malfunction related to each of the checked criteria, the status checking logic 13 does not alter any of the status registers 14. Instead, it returns immediately to a waiting state for receiving a new check status command from the software in step 311.

The malfunctions of the functional hardware which may be may be detected by the status checking logic 13 for one or more checked criteria may be due, for instance, to electrical glitches, an ESD pulse, a power shortage, etc.

The predetermined period of time of step 213 of FIG. 2 is selected such that it is ensured that the status checking logic 13 can perform all steps 311 to 315 of FIG. 3 within this period of time. When the predetermined period of time has passed, the software 18 reads again the current values of the status registers 14, which is indicated in FIG. 2 as a step 214. The software 18 thereby obtains a second version V2 of the register values.

If the software 18 determines in step 215 that the values of all status registers 14 have been altered in the meantime, the software 18 assumes that the LCD module 10 is operating properly. In this case, the software 18 waits until a new status check beginning with step 211 becomes appropriate.

If the software 18 determines in step 215, in contrast, that the value of at least one of the status registers 14 has not been altered in the meantime, the software assumes that there is some malfunction in the LCD module 10. Therefore, it causes a full hardware reset of the functional hardware 11, which is indicated in FIG. 2 as a step 216. After that, the software 18 waits until a new check becomes appropriate.

The software 18 will recognize in step 215 three types of malfunctions of the LCD module. It will recognize more specifically malfunctions in the functional hardware 11, malfunctions in the diagnosis component 12 and malfunctions in the interface of the LCD module 10, since in either case, the software 18 will read the same value of at least one of the status registers before and after the status check by the status checking logic 13.

Due to the plurality of status registers, the software is in addition able to differentiate between different problem areas in the functional hardware 11, for example between a bit error in the registers of the functional hardware 11 and inappropriate voltages levels in the functional hardware 11. The software 18 may therefore cause as well a selective hardware reset depending on the detected problem area in which a malfunction was detected by the status checking logic 13.

It has to be noted that instead of a general check status command, the software 18 could also send a selected check status command to the status checking logic 13 for causing a check of a particular problem area in the functional hardware 11.

On the whole, it becomes apparent that with the presented mobile terminal 1, a comprehensive and simple diagnosis of an LCD module 10 is achieved, which does not require a complex software 18.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of detecting a malfunction in a hardware module, said hardware module comprising a functional hardware adapted to provide a defined function and a diagnosis component including a logic and a status register, wherein said logic has access to said functional hardware and wherein a value of said at least one status register is readable by a software external to said hardware module, said method comprising at said logic:

receiving a check status command from an external software;

checking, in response to said check status command, a status of said functional hardware by comparing prestored initialization values of said functional hardware to current register values of said functional hardware; and updating a value of said at least one status register depending on a result of said status check wherein said value of said at least one status register is updated inasmuch that it is changed only in case a checked status of said functional hardware is in good order for enabling said software to detect a malfunction in said hardware module by detecting a same value in said at least one status register.

2. The method according to claim 1, further comprising performing a hardware reset of said functional hardware upon receipt of a corresponding hardware reset command from said external software at said hardware module.

3. The method according to claim 2, further comprising sending a check status command to said logic by said external software, reading said at least one status register by said external software and sending said hardware reset command to said functional hardware in case a read value of said at least one status register indicates to said external software that a hardware malfunction is present.

4. The method according to claim 1, wherein said check status command is one of a plurality of defined check status commands, each check status command resulting in a check of another kind of status of said functional hardware.

5. The method according to claim 1, wherein said status check comprises at least one of a check of a register value of said functional hardware, a check of a booster status in said functional hardware and a check of a voltage level in said functional hardware.

6. The method according to claim 1, wherein said at least one status register comprises a plurality of status registers, each of said status registers being associated to another problem area in said functional hardware, said logic updating a value of each of said status registers depending on the result of a status check for the respectively associated problem area.

7. A hardware module comprising:

a functional hardware adapted to provide a defined function; and a diagnosis component including a logic and at least one status register, which status register is readable by a software external to said hardware module, which logic has access to said functional hardware, which logic is adapted to receive at least one kind of check status command from an external software and to check a status of said functional hardware upon receipt of a check status command, wherein said check is carried out by comparing prestored initialization values of said functional hardware to current register values of said functional hardware and which logic is adapted to update a value of said at least one status register depending on a result of a performed status check wherein said logic is adapted to update said value of said at least one status register by changing it only in case a checked status of said functional hardware is in good order for enabling said software to detect a malfunction in said hardware module by detecting a same value in said at least one status register.

8. The hardware module according to claim 7, wherein said functional hardware is adapted to receive a hardware reset command from an external software and to perform a hardware reset upon receipt of such a hardware reset command.

9. The hardware module according to claim 7, wherein said check status command is one of a plurality of defined check status commands, said logic being adapted to check a specific kind of status of said functional hardware upon receipt of a specific one of said check status commands.

10. The hardware module according to claim 7, wherein said logic is adapted to perform a status check comprising at least one of a check of register values of said functional hardware, a check of booster statuses in said functional hardware and a check of voltage levels in said functional hardware.

11. The hardware module according to claim 7, wherein said at least one status register comprises a plurality of status registers, each of said status registers being associated to another problem area in said functional hardware, said logic being adapted to update a value of each of said status registers depending on the result of a status check for the respectively associated problem area.

12. A device comprising a processing unit running a software and a hardware module, said hardware module including:
   a functional hardware adapted to provide a defined function; and
   a diagnosis component including a logic and at least one status register, which status register is readable by said software, which logic has access to said functional hardware, which logic is adapted to receive at least one kind of check status command from said software and to check a status of said functional hardware upon receipt of a check status command, wherein said check is carried out by comparing prestored initialization values of said functional hardware to current register values of said functional hardware and which logic is adapted to update a value of said at least one status register depending on a result of a performed status check wherein said logic is adapted to update said value of said at least one status register by changing it only in case a checked status of said functional hardware is in good order for enabling said software to detect a malfunction in said hardware module by detecting a same value in said at least one status register.

13. The device according to claim 12, wherein said functional hardware is adapted to receive a hardware reset command from software and to perform a hardware reset upon receipt of such a hardware reset command.

14. The device according to claim 13, wherein said software is adapted to send a check status command to said logic, to read said at least one status register and to send a hardware reset command to said functional hardware in case a read value of said at least one status register indicates to said software that a hardware malfunction is present.

15. The device according to claim 12, wherein said check status command is one of a plurality of defined check status commands, said logic being adapted to check a specific kind of status of said functional hardware upon receipt of a specific one of said check status commands.

16. The device according to claim 12, wherein said logic is adapted to perform a status check comprising at least one of a check of register values of said functional hardware, a check of booster statuses in said functional hardware and a check of voltage levels in said functional hardware.

17. The device according to claim 12, wherein said at least one status register comprises a plurality of status registers, each of said status registers being associated to another problem area in said functional hardware, said logic being adapted to update a value of each of said status registers depending on the result of a status check for the respectively associated problem area.

* * * * *